United States Patent
Kubota (10) Patent No.: US 6,901,257 B2
(45) Date of Patent: May 31, 2005

(54) MOBILE COMMUNICATION SYSTEM FOR PERFORMING HAND-OFF CONTROL BASED ON CHANNEL STATION DATA

(75) Inventor: Hiroshi Kubota, Tokyo (JP)

(73) Assignee: NEC Corporation, Tokyo (JP)

( * ) Notice: Subject to any disclaimer, the term of this patent is extended or adjusted under 35 U.S.C. 154(b) by 468 days.

(21) Appl. No.: 09/754,278

(22) Filed: Jan. 5, 2001

(65) Prior Publication Data

US 2001/0007819 A1 Jul. 12, 2001

(30) Foreign Application Priority Data

Jan. 12, 2000 (JP) ........................................ 2000-003695

(51) Int. Cl.[7] .............................................. H04Q 7/20
(52) U.S. Cl. ...................... 455/439; 455/426; 455/436; 455/439; 455/443; 455/442; 370/252; 370/253; 370/331; 370/332; 370/412
(58) Field of Search ................................. 455/442, 436, 455/439, 426, 443, 524, 560, 438, 445, 452.1, 452.2; 370/252, 253, 331, 332, 412

(56) References Cited

U.S. PATENT DOCUMENTS

| | | | | |
|---|---|---|---|---|
| 5,101,501 A | * | 3/1992 | Gilhousen et al. | 455/442 |
| 5,697,055 A | * | 12/1997 | Gilhousen et al. | 455/436 |
| 5,956,641 A | * | 9/1999 | Bruckert et al. | 455/442 |
| 6,002,933 A | * | 12/1999 | Bender et al. | 455/442 |

FOREIGN PATENT DOCUMENTS

| | | |
|---|---|---|
| JP | 9-505948 | 6/1997 |
| JP | 9-511107 | 11/1997 |
| JP | 10-145834 | 5/1998 |
| WO | WO 95/08897 | 3/1995 |
| WO | WO95/20865 | 8/1995 |

\* cited by examiner

*Primary Examiner*—David Hudspeth
*Assistant Examiner*—Julio Perez
(74) *Attorney, Agent, or Firm*—McGinn & Gibb, PLLC (57) ABSTRACT

A mobile communication system performs a hand-off control process based on channel station data. The mobile communication system is managed by mobile switching centers having base station controllers and base stations under their control. One of the mobile switching centers in a home system and a mobile switching center in another system are connected to each other by an inter-system channel. Each of the base station controllers in the home system has inter-system channel data indicative of whether a mobile switching center as a master station is connected to the mobile switching center in the other system by an inter-system channel or not. When a mobile station moves from the home system into the other system and hand-off to the other system is to be performed, the inter-system channel data possessed by a base station controller which is the master station of the mobile station is searched.

9 Claims, 9 Drawing Sheets

| CELL ID OF BASE STATION OF OTHER SYSTEM | PRESENCE OF INTER-SYSTEM CHANNEL OF MOBILE SWITCHING CENTER |
|---|---|
| m | O |
| ⋮ | ⋮ |
| n | O |

Fig. 7

| CELL ID OF BASE STATION OF OTHER SYSTEM | PRESENCE OF INTER-SYSTEM CHANNEL OF MOBILE SWITCHING CENTER |
|---|---|
| p | 0 |
| ⋮ | ⋮ |
| q | 0 |

Fig. 8

| CELL ID OF BASE STATION OF OTHER SYSTEM | PRESENCE OF INTER-SYSTEM CHANNEL OF MOBILE SWITCHING CENTER |
|---|---|
| M | 1 |
| ⋮ | ⋮ |
| z | 0 |

Fig. 9

| BS IN COMMUNI-CATION MODE | BSC | HAND-OFF INFORMATION |
|---|---|---|
| BS IN COMMUNI-CATION MODE | BSC | HAND-OFF INFORMATION |
| ⋮ | ⋮ | ⋮ |
| BS IN COMMUNI-CATION MODE | BSC | HAND-OFF INFORMATION |

| PILOT NUMBER | CELL ID | HOME SYSTEM / OTHER SYSTEM |
|---|---|---|
| PILOT NUMBER | CELL ID | HOME SYSTEM / OTHER SYSTEM |
| ⋮ | CELL ID | ⋮ |
| PILOT NUMBER | CELL ID | HOME SYSTEM / OTHER SYSTEM |

MOBILE COMMUNICATION SYSTEM FOR PERFORMING HAND-OFF CONTROL BASED ON CHANNEL STATION DATA

BACKGROUND OF THE INVENTION

1. Field of the Invention

The present invention relates to a mobile communication system, and more particularly to a mobile communication system for switching communication channels between base stations covering respective communication areas as a mobile station moves between the communication areas.

2. Description of the Related Art

Mobile communication systems have a plurality of radio communication areas, each of a predetermined range, called cells, that cover an entire service area. Mobile stations in the service area can communicate with each other via base stations located in the respective cells. In such a mobile communication system, a channel switching control process is performed to switch base stations for radio communication with a mobile station as the mobile station moves from one cell to another. Such a channel switching control process is referred to as a hand-off control process. There are available two types of hand-off control processes, i.e., a hard hand-off control process with an instantaneous transmission break and a soft hand-off control process without an instantaneous transmission break.

The hard hand-off control process is simpler but causes an instantaneous transmission break because the present radio channel is cut off before the call is connected to a radio channel to switch to. The soft hand-off control process can switch radio channels without an instantaneous transmission break because the present radio channel remains connected when the call is connected to a radio channel to switch to.

For efficient usage of limited frequency resources, mobile communication systems allow mobile stations to make radio communication with base stations based on either the frequency division multiple access (FDMA) technique, the time division multiple access (TDMA) technique, or the code division multiple access (CDMA) technique. The CDMA mobile communication system often performs the soft hand-off control process free of an instantaneous transmission break using the same frequency in adjacent cells as the cells can easily share the same frequency band by spreading desired signals with respective inherent spreading codes.

Figure 1:
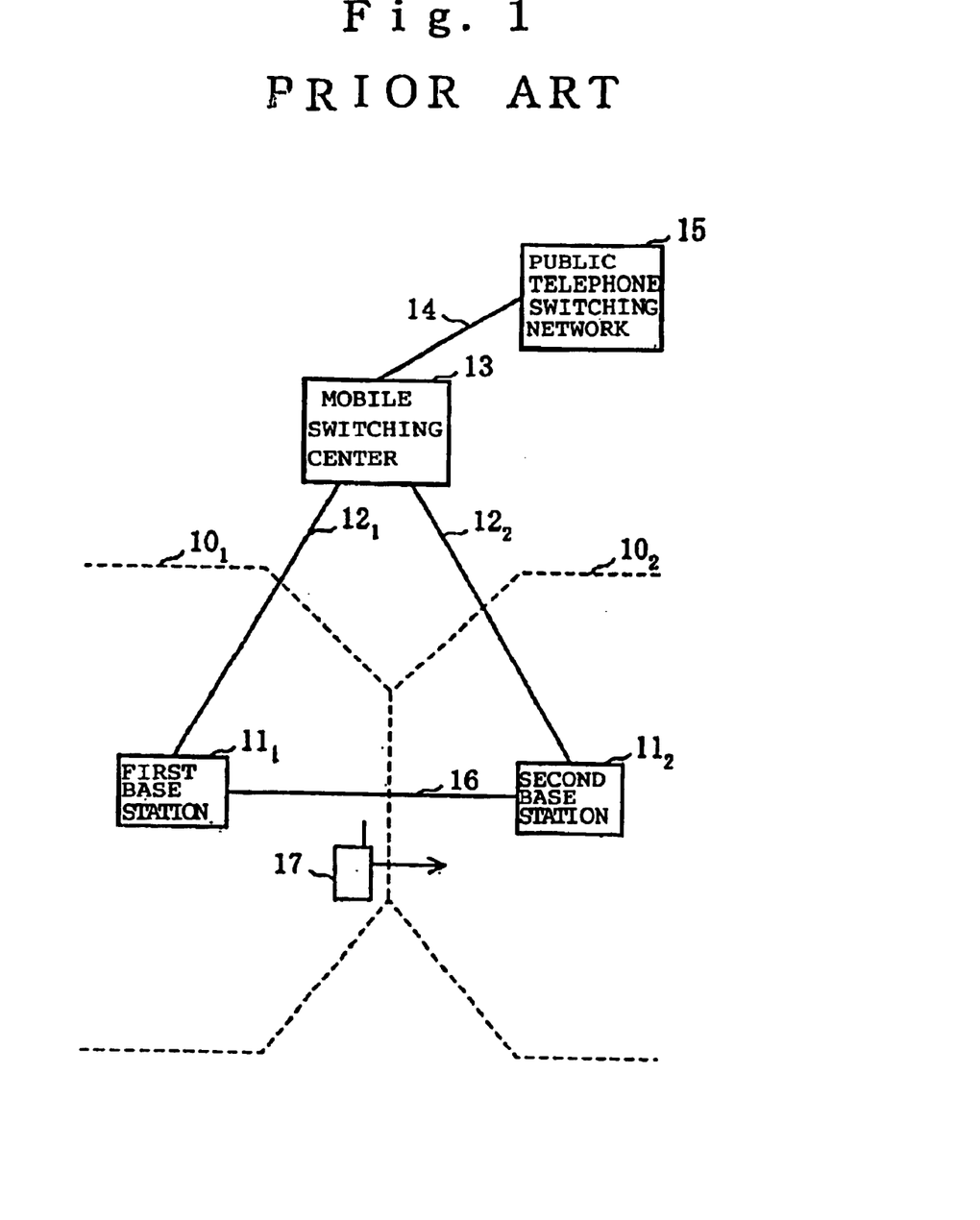
FIG. 1 is a block diagram of a conventional mobile communication system which performs a hand-off control process.

FIG. 1 of the accompanying drawings schematically shows a conventional mobile communication system which performs a hand-off control process. As shown in FIG. 1, the conventional mobile communication system has first and second base stations $11_1$, $11_2$ covering respective first and second cells $10_1$, $10_2$ as their service areas. First and second base stations $11_1$, $11_2$ are connected to a mobile switching center 13 by respective communication channels $12_1$, $12_2$. Mobile switching center 13 is connected to public telephone switching network 15 by inter-switching-center line 14. First and second base stations $11_1$, $11_2$ that are located adjacent to each other are connected to each other by inter-base-station line 16. Mobile switching center 13 may include a base station controller for controlling a plurality of base stations. Communication channels $12_1$, $12_2$ and inter-base-station line 16 send and receive control information required for the hand-off control process. In the hand-off control process to be described below, it is assumed for illustrative purpose that mobile station 17 present in first cell $10_1$ moves into second cell $10_2$.

Figure 2:
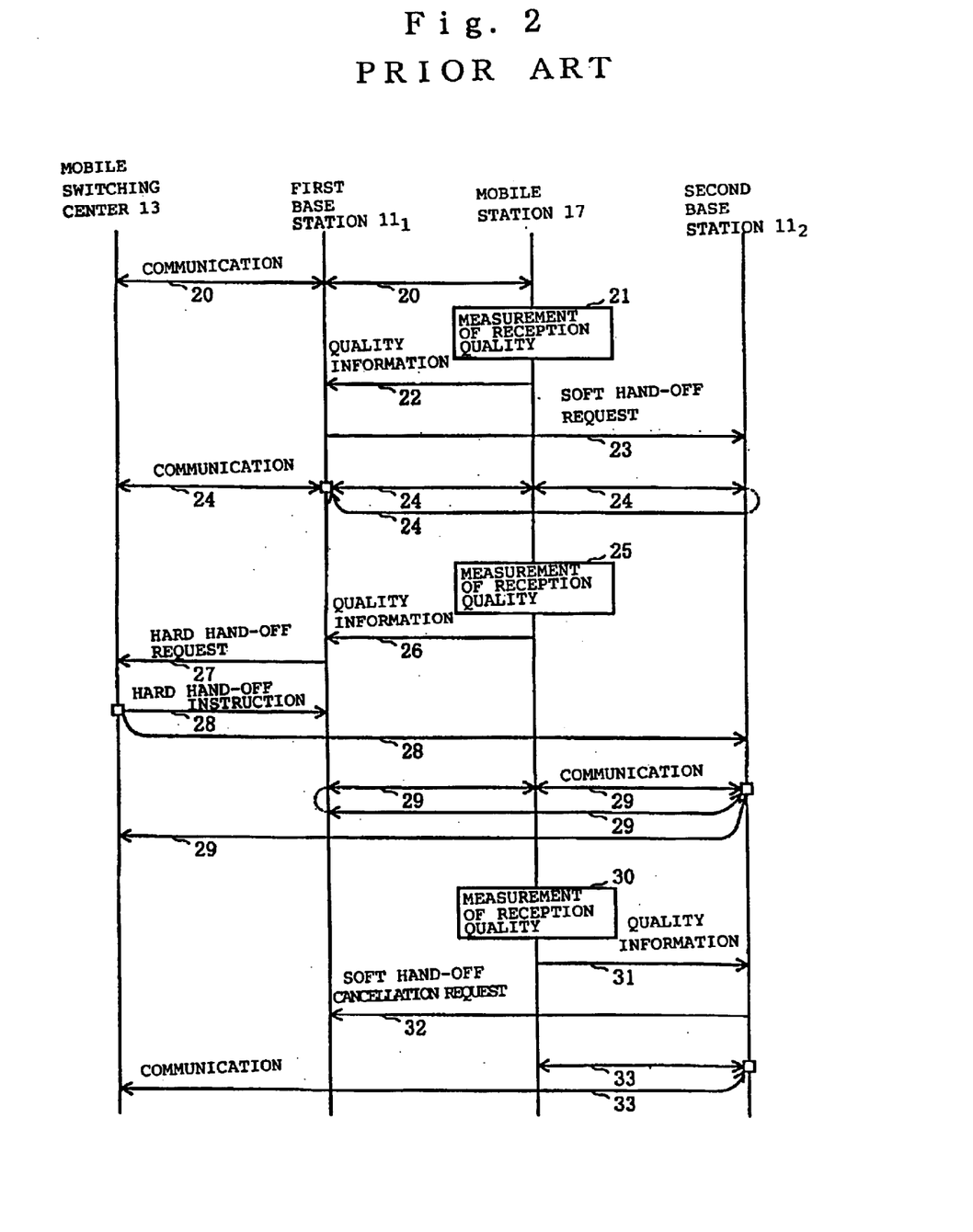
FIG. 2 is a sequence diagram showing a hand-off control sequence of the conventional mobile communication system.

FIG. 2 of the accompanying drawings schematically shows a sequence of the hand-off control process carried out by the conventional mobile communication system shown in FIG. 1. Mobile station 17 is present in first cell $10_1$, and is communicating with public telephone switching network 15 from first base station $11_1$ via communication channel $12_1$, mobile switching center 13, and inter-switching-center line 14 (communication 20). Mobile station 17 periodically measures a reception quality such as reception levels of radio waves received from surrounding base stations (measurement 21). If mobile station 17 detects, based on the measured results, that the channel quality between first base station $11_1$ and mobile station 17 is lowered and the channel quality between second base station $11_2$ and mobile station 17 is increased, then mobile station 17 sends quality information 22 representing such channel quality changes to first base station $11_1$ which is master base station for mobile station 17.

When first base station $11_1$ receives quality information 22, first base station $11_1$ performs a soft hand-off control process, and transmits soft hand-off request 23 to second base station $11_2$. Second base station $11_2$ assigns an inherent spreading code and sets a radio channel between itself and mobile station 17. Mobile station 17 now enters a soft hand-off mode dominated by first base station $11_1$ in which a radio channel is connected between mobile station 17 and first and second base stations $11_1$, $11_2$. Mobile station 17 then communicates with mobile switching center 13 via first and second base stations $11_1$, $11_2$ (communication 24).

In the soft hand-off mode dominated by first base station $11_1$, since mobile switching center 13 recognizes that mobile station 17 is under the control of first base station $11_1$, downstream user information is transmitted through a radio link from mobile switching center 13 via communication channel $12_1$ to first base station $11_1$ and then from first base station $11_1$ to mobile station 17. At the same time, the downstream user information from mobile switching center 13 is transmitted via inter-base-station line 16 from first base station $11_1$ to second base station $11_2$, from which the downstream user information is also transmitted through a radio link to mobile station 17. Mobile station 17 receives the downstream user information from first base station $11_1$ and second base station $11_2$ by way of diversity reception. Mobile station 17 transmits upstream user information to first base station $11_1$ and second base station $11_2$. The upstream user information received by second base station $11_2$ is transmitted via inter-base-station line 16 to first base station $11_1$. First base station $11_1$ receives the upstream user information by way of diversity reception, and transmits the received upstream user information via communication channel $12_1$ to mobile switching center 13.

When mobile station 17 measures the channel quality (measurement 25) and detects that the channel quality between first base station $11_1$ and mobile station 17 is further lowered and the channel quality between second base station $11_2$ and mobile station 17 is sufficient, mobile station 17 sends quality information 26 representing such channel quality changes to first base station $11_1$.

When first base station $11_1$ receives the quality information, first base station $11_1$ sends hard hand-off request 27 to mobile switching center 13 which is master station for first base station $11_1$ in order to shift from the soft hand-off mode dominated by first base station $11_1$ to a soft hand-off mode dominated by second base station $11_2$.

In response to hard hand-off request 27 sent from first base station $11_1$, mobile switching center 13 transmits hard hand-off instruction 28 via communication channels $12_1$, $12_2$ to first and second base stations $11_1$, $11_2$, thereby recognizing that mobile station 17 has been brought under the control of second base station $11_2$. Mobile station 17 now enters the soft hand-off mode dominated by second base station $11_2$ in which a radio channel is connected between mobile station 17 and first and second base stations $11_1$, $11_2$. Mobile station 17 then communicates with mobile switching center 13 via first and second base stations $11_1$, $11_2$ (communication 29).

When mobile station 17 measures the channel quality (measurement 30) and detects that the channel quality between first base station $11_1$ and mobile station 17 is sufficiently lowered, mobile station 17 sends quality information 31 representing such channel quality changes to second base station $11_2$.

Having received quality information 31, second base station $11_2$ transmits a soft hand-off cancellation request 32 via inter-base-station line 16 to first base station $11_1$ that is in the soft hand-off mode, finishes the soft hand-off mode, and enters a normal communication mode. Mobile station 17 can now communicate with public telephone switching network 15 via second base station $11_2$, communication channel $12_2$, mobile switching center 13, and inter-switching-center line 14 (communication 33).

In the above conventional mobile communication system, the inter-base-station line is provided between the adjacent base stations, and control information about the soft hand-off control of radio channels between the base stations and the mobile station and the hard hand-off control between the base stations and the mobile switching center is sent and received between the base stations. Therefore, the burden on the mobile switching center due to the soft hand-off control process can be reduced.

The technical details of the above mobile communication system are disclosed in Japanese unexamined patent publication No. 10-145834 on "Method of carrying out soft hand-off control in mobile communication system, mobile communication system and radio base station therefor".

Published Japanese translation of PCT international publication No. 9-511107 on "Semi-hard hand-off in cellular electric communication system" discloses the technology of a mobile communication system for performing semi-hard hand-off control by placing a base station in an overlapping region covered by adjacent base stations under the control of different mobile switching centers, which serve as a master station for the base station placed in the overlapping region.

Figure 3:
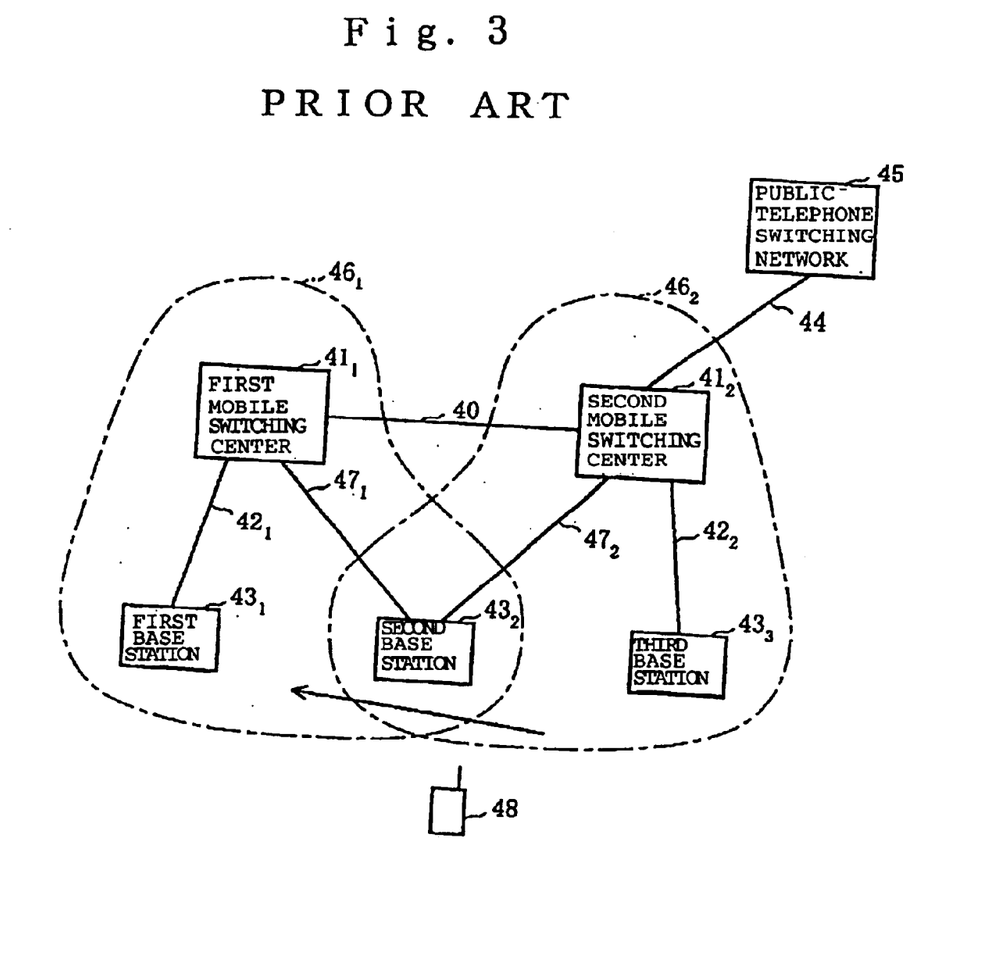
FIG. 3 is a block diagram of a mobile communication system disclosed in published Japanese translation of PCT international publication No. 9-511107.

FIG. 3 of the accompanying drawings schematically shows an arrangement of the mobile communication system disclosed in the published Japanese translation of PCT international publication No. 9-511107. As shown in FIG. 3, the mobile communication system has first and second mobile switching centers $41_1$, $41_2$ connected to each other by switching center channel 40 and also connected to respective first and third base stations $43_1$, $43_3$ under its control by respective communication channels $42_1$, $42_2$. Second mobile switching center $41_2$ is connected to public telephone switching network 45 via public network line 44. First and third base stations $43_1$, $43_3$ cover respective areas $46_1$, $46_2$, which have an overlapping region that is covered by second base station $43_2$. Second base station $43_2$ has, as its master station, first and second mobile switching centers $41_1$, $41_2$, and is connected thereto by respective communication channels $47_1$, $47_2$.

It is assumed that mobile station 48 has third base station $43_3$ as its master station, is communicating with public telephone switching network 45 via second mobile switching center $41_2$, and moves successively through the cells covered by second base station $43_2$ and first base station $43_1$. When mobile station 48 moves from the cell covered by third base station $43_3$ to the cell covered by second base station $43_2$, a soft hand-off control process is performed while mobile station 48 is being connected to second and third base stations $43_2$, $43_3$ via communication channels $42_2$, $47_2$. At this time, second mobile switching center $41_2$ as a node receives information by way of diversity reception. As mobile station 48 moves away from third base station $43_3$ toward second base station $43_2$, the soft hand-off control process is finished, and mobile station 48 has second base station $43_2$ as its master station and communicates with public telephone switching network 45 via second mobile switching center $41_2$.

Mobile station 48 periodically reports measured reception quality to second base station $43_2$ as its master station. If second mobile switching center $41_2$ detects, based on the report, that mobile station 48 is moving from second base station $43_2$ under its own control toward first base station $43_1$ under the control of another mobile switching center, then second mobile switching center $41_2$ starts a semi-hard hand-off control process. Specifically, second mobile switching center $41_2$ detects that first base station $43_1$ covering the cell toward which mobile station 48 is moving is under the control of first mobile switching center $41_1$ adjacent to second mobile switching center $41_2$, and sends a semi-hard hand-off request to first mobile switching center $41_1$ via switching center channel 40. First mobile switching center $41_1$, which is connected to second base station $43_2$ by communication channel $47_1$, transmits a semi-hard hand-off response to second mobile switching center $41_2$ via switching center channel 40. In response to the semi-hard hand-off reply, second mobile switching center $41_2$ disconnects communication channel $47_2$ between itself and second base station $43_2$. Mobile station 48 now has second base station $43_2$ as its master station and communicates with public telephone switching network 45 via first mobile switching center $41_1$, switching center channel 40, and second mobile switching center $41_2$.

When mobile station 48 further moves toward first base station $43_1$ under the control of first mobile switching center $41_1$, a soft hand-off control process is carried out in which mobile station 48 is connected to first and second base stations $43_1$, $43_2$ via communication channels $42_1$, $47_1$, and first mobile switching center $41_1$ as a node receives information by way of diversity reception.

In the above conventional mobile communication system, the hand-off control process performed when the mobile station moves is a soft hand-off control process without an instantaneous transmission break, rather than a hard hand-off control process with an instantaneous transmission break. Therefore, channels are provided between the base stations for performing the soft hand-off control process, between base station control apparatus, or between the mobile switching centers for sending and receiving user information. When the mobile station continues to move while in communication, the soft hand-off control process is repeated not only between the base stations, but also between the base station control apparatus as master stations for the base stations, and between the mobile switching centers as master stations therefor. When the mobile station further moves while the soft hand-off control process is being performed between the mobile switching centers, the mobile station may move from the service area of home system into the service area of another system.

A hand-off control process needs to be performed between different systems for increasing the quality of services provided to the users of mobile stations. In order to carry out such a hand-off control process between different systems, it is necessary to provide communication channels between mobile switching centers of one of the systems which control communications of the mobile station and adjacent mobile switching centers of the other system. However, attempts to provide communication channels between all adjacent mobile switching centers of the different systems would result in a high installation cost.

SUMMARY OF THE INVENTION

It is an object of the present invention to provide a relatively inexpensive mobile communication system which is capable of performing a hand-off control process between different systems.

To achieve the above object, a mobile communication system according to the present invention has a mobile station, a base station, a base station controller, and a mobile switching center.

The base station is disposed in each of service areas for performing radio communication with the mobile station positioned in each of service areas.

The base station controller has channel station data indicative of whether there is a channel between a mobile switching center as a master station thereof and another mobile switching center. The base station controller has means for, when a hand-off control process is to be performed via the mobile switching center as the master station while communicating with the mobile terminal through the base station, determining whether the mobile switching center as the master station has a channel connected to the other mobile switching center or not based on the channel station data, and, if the mobile switching center as the master station has a channel connected to the other mobile switching center, requesting a hand-off control process as a process for switching communication channels for communication with the mobile station.

The mobile switching center as the master station of the base station controller performs a hand-off control process between itself and the other mobile switching center when the hand-off control process is requested.

With the above arrangement, the base station controller has channel station data indicative of whether there is a channel between a mobile switching center as a master station thereof and another mobile switching center. When a hand-off control process is to be performed via the mobile switching center as the master station while communicating with the mobile terminal through the base station, the base station controller determines whether the mobile switching center as the master station has a channel connected to the other mobile switching center or not based on the channel station data. If the mobile switching center as the master station has a channel connected to the other mobile switching center, then the base station controller requests a hand-off control process. The mobile switching center performs a hand-off control process when the hand-off control process is requested.

According to the present invention, another mobile communication system has a mobile station, one or more base stations, one or more base station controllers, and one or more interconnected mobile switching centers.

The one or more base stations are disposed in each of service areas for performing radio communication with the mobile station positioned in each of service areas.

The one or more base station controllers serve as a master station of the one or more base stations and have channel station data indicative of whether there is a channel between a mobile switching center as a master station thereof and another system mobile switching center in another system of different specifications. The one or more base station controllers have means for, when a hand-off control process is to be performed via the mobile switching center as the master station while communicating with the mobile terminal through the base station during an inter-base-station-controller soft hand-off control process, determining whether the mobile switching center as the master station has a channel connected to the other system mobile switching center or not based on the channel station data, and, if the mobile switching center as the master station has a channel connected to the other system mobile switching center, requesting an inter-system hand-off control process as a process for switching communication channels between the mobile station and the other system mobile switching center to the mobile switching center as the master station, and, if the mobile switching center as the master station does not have a channel connected to the other system mobile switching center, requesting an intra-system hand-off control process between the mobile station and the mobile switching center in a home system.

The one or more interconnected mobile switching centers serve as a master station of at least one of the one or more base station controllers, for performing the hand-off control process in a home system when the intra-system hand-off control process is requested, at least one of the one or more interconnected mobile switching centers having a communication channel connected to the other system mobile switching center, for performing a predetermined hand-off control process between itself and the other system mobile switching center when the inter-system hand-off control process is requested.

With the above arrangement, each of the one or more base station controllers which are disposed adjacent to each other and interconnected has channel station data indicative of whether there is a channel between a mobile switching center as a master station thereof and another system mobile switching center in another system of different specifications. When a hand-off control process is to be performed via the mobile switching center as the master station while communicating with the mobile terminal through the base station during an inter-base-station-controller soft hand-off control process, the one or more base station controllers determine whether the mobile switching center as the master station has a channel connected to the other system mobile switching center or not based on the channel station data. If the mobile switching center as the master station has a channel connected to the other system mobile switching center, the one or more base station controllers request an inter-system hand-off control process as a process for switching communication channels between the mobile station and the other system mobile switching center to the mobile switching center as the master station. If the mobile switching center as the master station does not have a channel connected to the other system mobile switching center, the one or more base station controllers request an intra-system hand-off control process between the mobile station and the mobile switching center in a home system. At least one of the one or more interconnected mobile switching centers which serve as a master station of the one or more base station controllers has a communication channel between itself and the other system mobile switching center. The one or more mobile switching centers perform a handoff control process between itself and the other system mobile switching center when the inter-system hand-off control process is requested, and perform the hand-off control process in a home system when the intra-system hand-off control process is requested.

The mobile communication system has a communication channel between only a mobile switching center adjacent to a service area of the other system including an overlay and the other system mobile switching center.

Because a communication channel is provided between only a mobile switching center adjacent to a service area of the other system including an overlay and the other system mobile switching center, the cost of facilities of an inter-system channel required for an inter-system hand-off control process is minimized.

According to another aspect of the present invention, the mobile switching center comprises means for, when the intra-system hand-off control process is requested, selecting a mobile switching center in the home system which has a communication channel connected to the other system mobile switching center, and performing a hand-off control process between itself and the selected mobile switching center.

With the above arrangement, when the intra-system hand-off control process is requested, a mobile switching center in the home system which has a communication channel connected to the other system mobile switching center is selected, and a hand-off control process is performed between itself and the selected mobile switching center. Therefore, when a hand-off control process between the systems is required via the channel through which the mobile station is communicating, the inter-system hand-off control process is carried out, thus simplifying the inter-mobile-switching-center hand-off control process between the systems.

The home system comprises a mobile communication system according to code division multiple access principles.

With the above arrangement, the hand-off control process is performed in the mobile communication system according to code division multiple access principles. Particularly, a large-scale mobile communication system which has many mobile switching centers allows the same frequency to be used in adjacent cells and hence allows an inter-system hand-off control process to be carried out using pilot signals of the same frequency between cells in different cellular systems. A reduction in the cost of facilities of such a large-scale mobile communication system is highly advantageous.

The above and other objects, features, and advantages of the present invention will apparent from the following description with reference to the accompanying drawings which illustrate examples of the present invention.

BRIEF DESCRIPTION OF THE DRAWINGS

FIG. 5 is a flowchart of a pilot signal receiving process of a mobile station in the mobile communication system according to the embodiment;

FIG. 12 a sequence diagram of a former half of an operation sequence of the mobile communication system according to the embodiment.

DETAILED DESCRIPTION OF THE PREFERRED EMBODIMENTS

Figure 4:
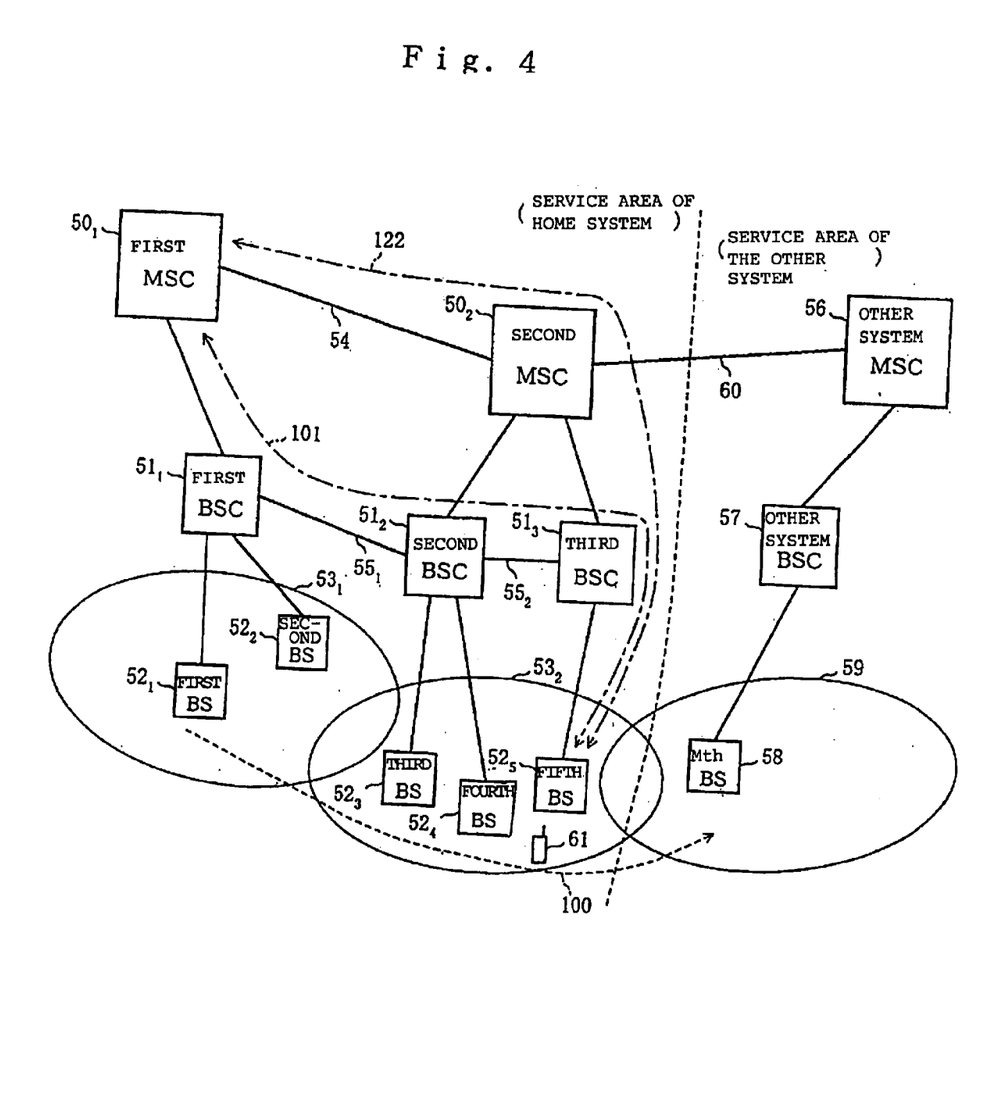
FIG. 4 is a block diagram of a mobile communication system according to an embodiment of the present invention.

FIG. 4 schematically shows a mobile communication system according to an embodiment of the present invention. The mobile communication system according to the embodiment has the service area of a home cellular system and the service area of another cellular system, which are differentiated by system providers, communication principles, channel protocols, and various other different specifications. It is assumed that the home cellular system is a CDMA system and the other system is an analog system.

The service area of the home cellular system has first and second mobile switching centers (MSC) $50_1$, $50_2$. First MSC $50_1$ controls first base station controller (BSC) $51_1$ as its slave station, and second MSC $50_2$ controls second and third BSCs $51_2$, $51_3$ as its slave stations. First BSC $51_1$ controls first and second base stations (BS) $52_1$, $52_2$ as its slave stations, which cover first service area $53_1$. Second BSC $51_2$ controls third and fourth BSs $52_3$, $52_4$ as its slave stations, and third BSC $51_3$ controls fifth BS $52_5$ as its slave station. Third, fourth, and fifth BSs $52_3$, $52_4$, $52_5$ cover second service area $53_2$.

Inter-MSC channel 54 is connected between first and second MSCs $50_1$, $50_2$, and an inter-MSC hard hand-off control process is performed via inter-MSC channel 54. First and second inter-BSC channels $55_1$, $55_2$ are connected between first and second BSCs $51_1$, $51_2$ and between second and third BSCs $51_2$, $51_3$. A BSC soft hand-off control process is performed via first and second inter-BSC channels $55_1$, $55_2$.

The service area of the other cellular system has other system MSC 56 which controls other system BSC 57 as its slave station. Other system BSC 57 controls Mth BS 58 as its slave station, which covers other system service area 59.

In the other cellular system, a pilot signal having a frequency used by the home cellular system can be transmitted to Mth BS 58 whose service area is positioned close to the home cellular system. Therefore, a mobile station (MS) which is receiving a pilot signal on the CDMA principle in the service area of the home cellular system can recognize the presence of a pilot signal of the other cellular system.

In the mobile communication system according to the present embodiment, second MSC $50_2$ closest of the MSCs in the home cellular system to the service area of the other cellular system and other system MSC 56 closest of the MSCs in the other cellular system to the service area of the home cellular system are connected to each other by inter-system channel 60. An inter-system hard hand-off control process is performed via inter-system channel 60.

Each of the BSCs of the home cellular system possesses inter-system channel station data indicative of whether an MSC as a master station thereof in the home cellular system and an MSC in the other cellular system are connected by an inter-system channel or not. When an MS moving in the service area of the home cellular system enters the service area of the other cellular system for hand-off to the other cellular system, the following process is performed: The BSC which is the master station of the MS checks the inter-system channel station data possessed thereby to determine whether an inter-system channel is connected to the MSC which is the master station of the BSC. If no inter-system channel is connected to the MSC which is the master station of the BSC, then the BSC performs an inter-MSC hard hand-off control process for hand-off to a BS under the control of an MSC having an inter-system channel. If an inter-system channel is connected to the MSC which is the master station of the BSC, then the BSC performs an inter-system hard hand-off control process via the inter-system channel.

Operation of the mobile communication system according to the embodiment will be described in detail below.

First through fifth BSs $52_1$–$52_5$ and Mth BS 58 periodically transmit pilot signals to the BSs under their control. Since the home cellular system is a CDMA system, the pilot signals are spread using spreading codes that are different in the respective BSs, the pilot signals which have the same frequency can be used in adjacent areas. The pilot signals are different for the respective BSs, and comprise respective cell identifiers (ID) under the control of the BSs for identifying the respective BSs.

Each of the BSs which receive the pilot signals has a central processing unit (CPU) for performing a predetermined reception process according to a control program that is stored in a storage unit such as a read-only memory (ROM).

FIG. 5 shows a pilot signal receiving process performed by an MS in the mobile communication system according to the embodiment. In step 70 shown in FIG. 5, the MS monitors pilot signals received from a plurality of respective BSs. If the MS detects a pilot signal from any one of the BSs in step 70, then the MS despreads the pilot signal with a predetermined spreading code to determine which BS has transmitted the pilot signal, and measures the received intensity of the pilot signal. In step 72, the MS determines whether the measured received intensity is in excess of a given level or not. If the measured received intensity is in excess of the given level in step 72, then the MS transmits a pilot signal intensity report to the BS which has sent the received pilot signal including all pilot numbers of the pilot signals which MS may receive at that time. Thereafter, the MS monitors pilot signals from the respective BSs again. If the measured received intensity is not in excess of the given level in step 72, then the MS monitors pilot signals from the respective BSs again.

Operation of the BSCs in the mobile communication system according to the embodiment will be described below.

As described above, each of the BSCs possesses inter-system channel station data indicative of whether an MSC as a master station thereof and an MSC in the other cellular system are connected by an inter-system channel or not. The inter-system channel station data are registered in the respective BSCs in association with the respective cell IDs for the BSs under the control of the BSCs to identify the cells of the adjacent other system.

Figure 6:
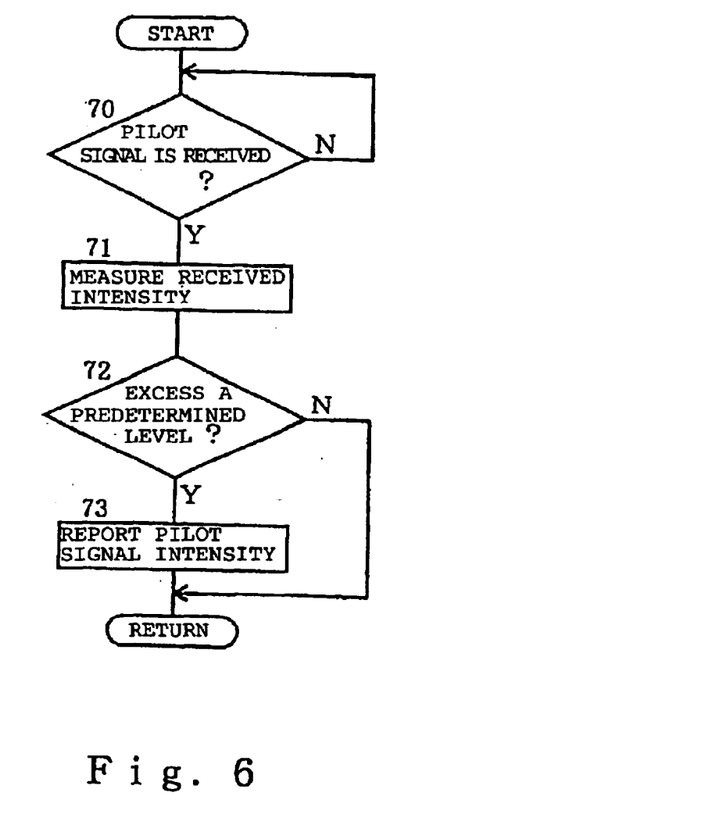
FIG. 6 is a diagram showing inter-system channel station data possessed by a first base station controller in the mobile communication system according to the embodiment.

FIG. 6 shows inter-system channel station data possessed by first BSC $51_1$ in the mobile communication system according to the embodiment. The inter-system channel station data shown in FIG. 6 indicate cells having respective cell IDS "m"–"n", in the vicinity of a BS under the control of first BSC $51_1$, and station data values representing whether there is an inter-system channel between MSCs as master stations of those cells and first MSC $50_1$ as the master station of first BSC $51_1$. In the illustrated embodiment, since Mth BS 58 is not included in a cell in the vicinity of first BSC $51_1$ and there is no inter-system channel between first BSC $51_1$ and other system MSCs, all the station data values are set to "0" indicating that there is no inter-system channel.

Figure 7:
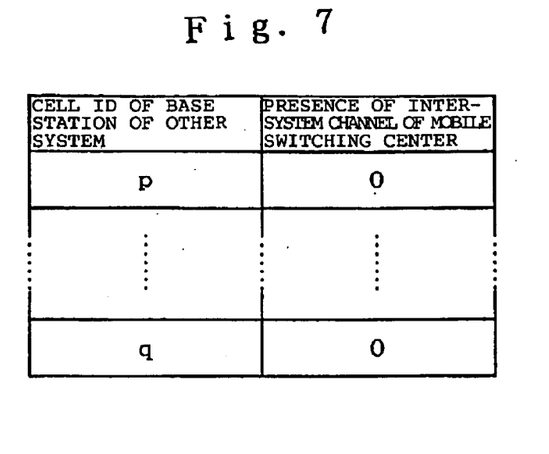
FIG. 7 is a diagram showing inter-system channel station data possessed by a second base station controller in the mobile communication system according to the embodiment.

FIG. 7 shows inter-system channel station data possessed by second BSC $51_2$ in the mobile communication system according to the embodiment. The inter-system channel station data shown in FIG. 7 indicate cells having respective cell IDS "p"–"q", in the vicinity of a BS under the control of second BSC $51_2$, and station data values representing whether there is an inter-system channel between MSCs as master stations of those cells and second MSC $50_2$ as the master station of second BSC $51_2$. In the illustrated embodiment, second MSC $50_2$ as the master station of second BSC $51_2$ is connected to the other system MSC 56 by the inter-system channel 60. However, since there is no cell under the control of the other system MSC 56 in the vicinity of second BSC $51_2$, all the station data values are set to "0" indicating that there is no inter-system channel.

Figure 8:
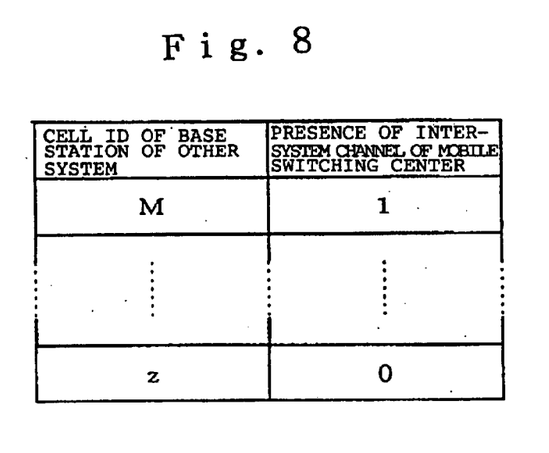
FIG. 8 is a diagram showing inter-system channel station data possessed by a third base station controller in the mobile communication system according to the embodiment.

FIG. 8 shows inter-system channel station data possessed by third BSC $51_3$ in the mobile communication system according to the embodiment. The inter-system channel station data shown in FIG. 8 indicate cells having respective cell IDS "M"–"z", in the vicinity of a BS under the control of third BSC $51_3$, and station data values representing whether there is an inter-system channel between MSCs as master stations of those cells and second MSC $50_2$ as the master station of third BSC $51_3$. In the illustrated embodiment, second MSC $50_2$ as the master station of third BSC $51_3$ is connected to the other system MSC 56 by the inter-system channel 60. Since there is a cell ID "M" identifying Mth BS 58 under the control of the other system MSC 56 in the vicinity of third BSC $51_3$, the station data value indicative of whether there is an inter-system channel corresponding to the cell ID "M" is set to "1", and the station data values corresponding to the other cell IDs are set to "0" indicating that there is no inter-system channel.

Based on a pilot signal intensity report from an MS as shown in FIG. 5, a BSC having such inter-system channel station data performs an inter-MSC hard hand-off control process for hand-off in the home cellular system and an inter-system hard hand-off control process for hand-off to the other cellular system. Such a BSC carries out the hand-off control processes based on inter-BSC hand-off control information and proximity cell information of BSs under its control, in addition to the above inter-system channel station data.

Figure 9:
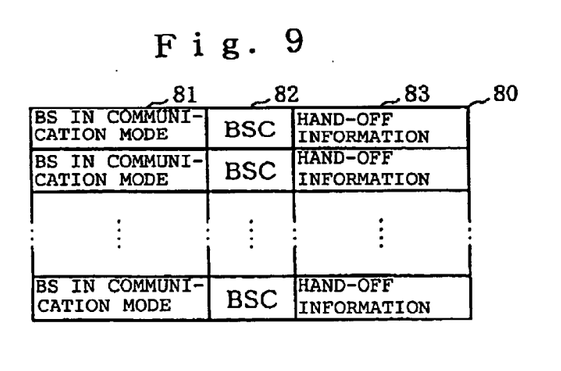
FIG. 9 is a diagram showing inter-base-station-controller hand-off control information possessed by the base station controllers in the mobile communication system according to the embodiment.

FIG. 9 shows inter-BSC hand-off control information 80 possessed by the BSCs in the mobile communication system according to the embodiment. As shown in FIG. 9, the inter-BSC hand-off control information 80 possessed by the BSCs includes, for respective communication paths managed by the BSCs, base stations 81 communicating with MS 61 in communication modes including a soft hand-off control mode, BSCs 82 as respective master stations of those base stations, and hand-off information 83 representing received intensities of radio waves and whether the BSCs dominate a soft hand-off control process or not.

Figure 10:
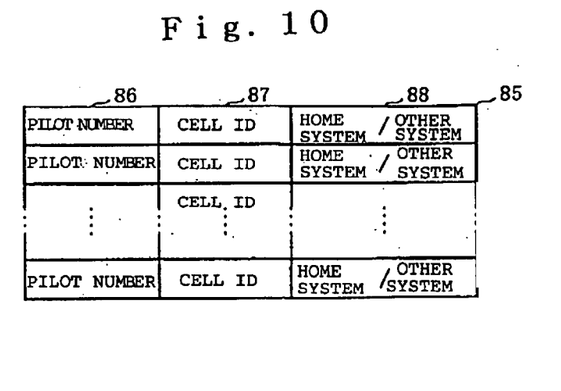
FIG. 10 is a diagram showing proximity cell information possessed by the base station controllers in the mobile communication system according to the embodiment.

FIG. 10 shows proximity cell information 85 possessed by the BSCs in the mobile communication system according to the embodiment. As shown in FIG. 10, the proximity cell information 85 possessed by the BSCs includes pilot numbers 86 corresponding to respective cell IDs 87 for identifying cells adjacent to base stations under the control of the BSCs, and system identifiers 88 corresponding to respective cell IDs 87 for indicating whether adjacent cells belong to the home cellular system or the other cellular system.

Each of the BSCs has a CPU (not shown) for executing the above control process according to a control program that is stored in a storage unit such as a ROM.

Figure 11:
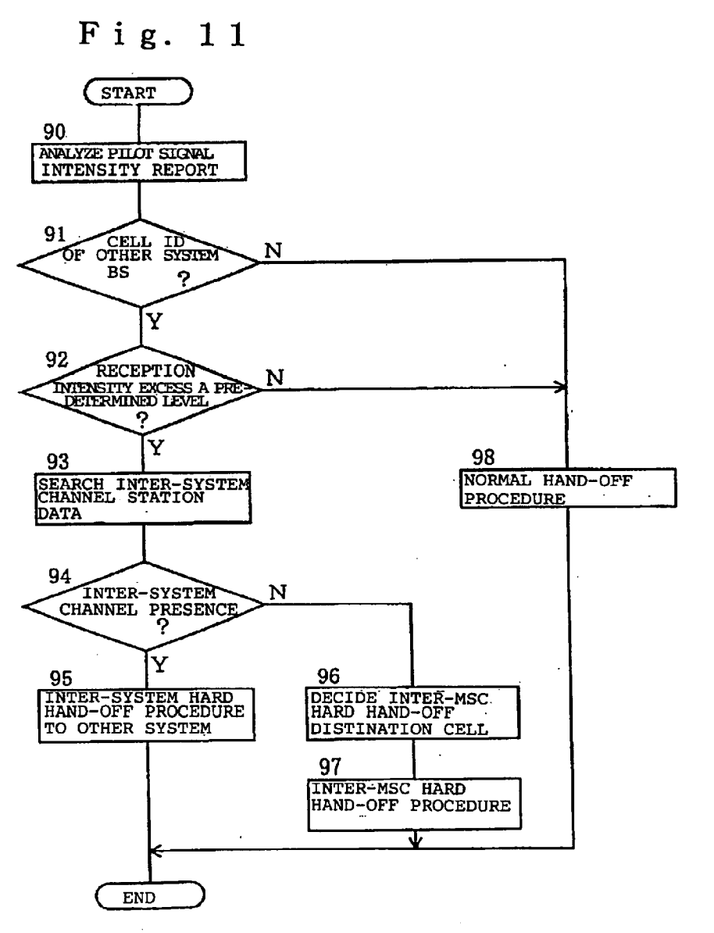
FIG. 11 is a flowchart of a control program of each of the base station controllers in the mobile communication system according to the embodiment.

FIG. 11 shows a control program of each of the BSCs n the mobile communication system according to the embodiment. When a BSC receives a pilot signal intensity report from the MS which has received pilot signals periodically transmitted from BSs under the control of the BSC in an established communication path, the BSC analyzes the pilot signal intensity report in step 90. Specifically, the BSC refers to the proximity cell information shown in FIG. 10 to convert pilot numbers indicated by the pilot signal intensity report into cell IDs and recognizes whether the cells belong to the home cellular system or the other cellular system based on the system identifiers.

If the proximity cell information possessed by the BSC does not include a pilot number searched for, then the BSC refers to the registered inter-BSC hand-off control information shown in FIG. 9 to look for a BSC which is the master station of the MS that is in communication modes including the soft hand-off mode in the communication path. If there are a plurality of BSCs that are the master station of the MS that is in communication modes including a soft hand-off mode, then the BSC selects an optimum one of the BSCs based on the received intensity of the radio wave from the stored inter-BSC hand-off control information corresponding to the BSCs. The BSC transmits a pilot signal intensity report analysis request to the selected BSC. The BSC which has received the pilot signal intensity report analysis request refers to the proximity cell information thereof based on the indicated pilot number, converts the pilot number into a cell ID, and determines whether the cell ID belongs to home cellular system or not based on the system identifier. If the cell ID belongs to the other cellular system, then the BSC reads inter-system channel station data, extracts information as to whether there is an inter-system channel between an MSC which is the master station of the cell of the other cellular system and an MSC which is the master station of the BSC, and returns the extracted information together with the converted cell ID as a pilot signal intensity report analysis result to the BSC that has transmitted the pilot signal intensity report analysis request.

Based on the received pilot signal intensity report analysis result, the BSC determines whether the received pilot signal intensity report includes a cell ID belonging to the other cellular system or not in step 91. If the received pilot signal intensity report includes at least one cell ID belonging to the other cellular system in step 91, then the BSC determines whether the received intensity of the pilot signal that is indicated by the pilot signal intensity report is in excess of a predetermined level, which is given as a threshold for performing an inter-system hand-off control process, or not in step 92.

If the received intensity is in excess of the predetermined level in step 92, then the BSC searches the inter-system channel station data shown in FIGS. 6 through 9 for the cell ID converted based on the pilot signal intensity report analysis result in step 93. Then, in step 94, the BSC determines whether the cell ID converted based on the pilot signal intensity report analysis result is present in the inter-system channel station data held thereby or not. If the cell ID converted based on the pilot signal intensity report analysis result is present in the inter-system channel station data held thereby in step S94, then the BSC decides that the MSC which is the master station of the BSC has an inter-system channel connected to an MSC of the other cellular system. In step S95, the BSC performs an inter-system hard hand-off control process for hand-off to the other cellular system. Thereafter, the above sequence of the control process is put to an end.

If the cell ID converted based on the pilot signal intensity report analysis result is not present in the inter-system channel station data held by the BSC in step 94, then the BSC performs an inter-MSC hard hand-off control process. Specifically, in step 96, the BSC determines, as a hand-off destination, the MSC having an inter-system channel connected to an MSC which is the master station of a BS in the other cellular system converted based on the pilot signal intensity report analysis result and also having a cell in a best radio wave environment. Then, the BSC carries out an inter-MSC hard hand-off control process in step 97, after which the above sequence of the control process is put to an end.

If the received pilot signal intensity report includes only a cell ID belonging to home cellular system based on the pilot signal intensity report analysis result in step 91, or if the received intensity is not in excess of the predetermined level in step 92, then the BSC performs a normal hand-off control process. Thereafter, the above sequence of the control process is put to an end.

Operation of the mobile communication system according to the embodiment will specifically be described below with reference to FIGS. 12 and 13.

Figure 13:
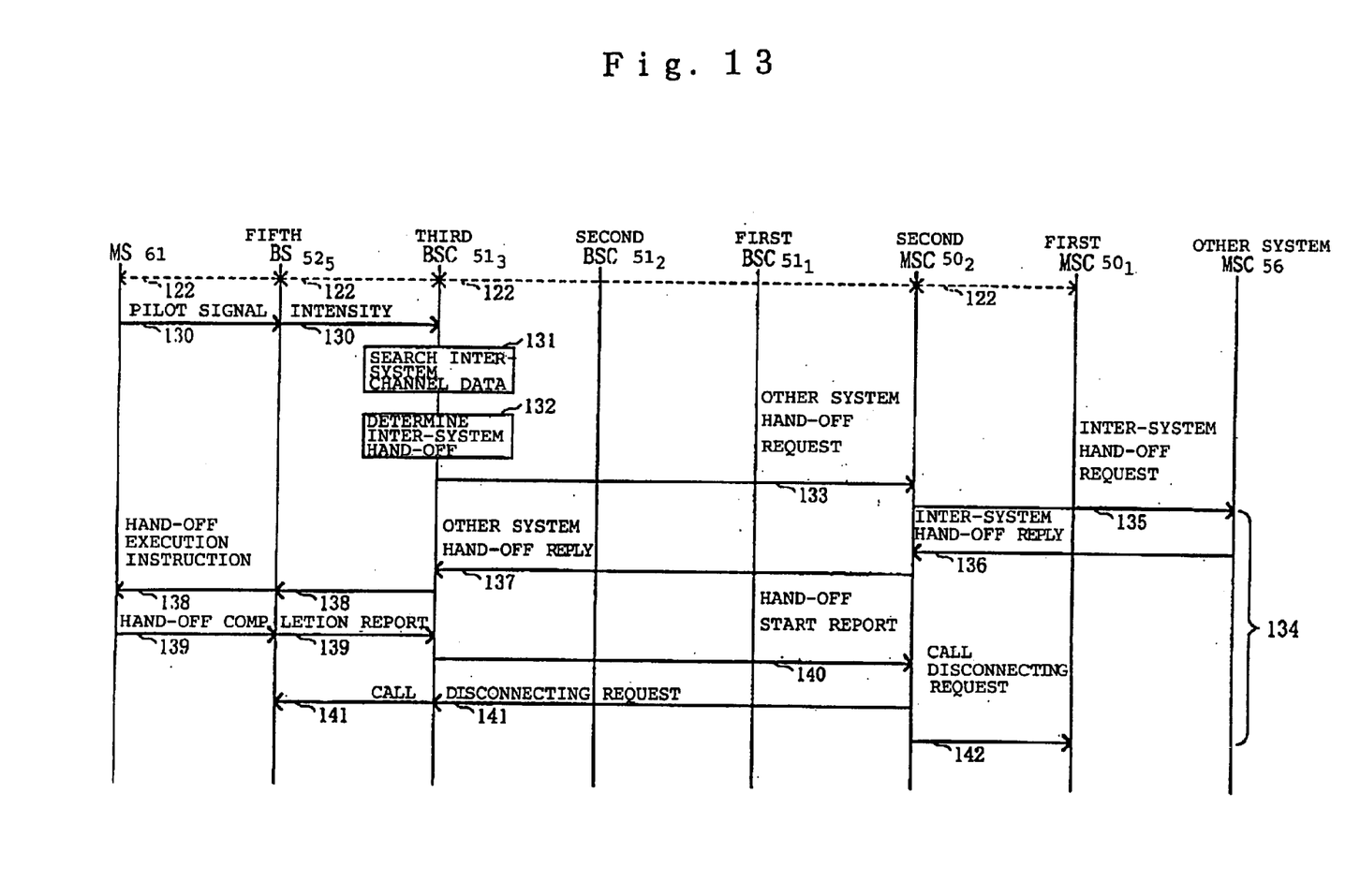
FIG. 13 a sequence diagram of a latter half of the operation sequence of the mobile communication system according to the embodiment.

FIGS. 12 and 13 show an operation sequence of the mobile communication system according to the embodiment. It is assumed that, as shown in FIG. 4, after MS 61 has made a call to a party accommodated in a public telephone network (not shown) connected to first MSC $50_1$ under the control of first BS $52_1$, MS 61 moves in the direction indicated by the broken-line arrow 100 successively under the control of 1st BS $52_1$, third BS $52_3$, fourth BS $52_4$, and fifth BS $52_5$ while keeping the communication with the called party. During the communication while MS 61 is thus moving, an inter-BSC soft hand-off control process is performed between BSCs via first and second inter-BSC channels $55_1$, $55_2$. As a result, communication path 101 is established under the control of fifth BS $52_5$.

As described above with reference to FIG. 5, MS 61 periodically receives pilot signals transmitted from surrounding BSs and measures the intensities of the received pilot signals. As MS 61 further moves from the control of fifth BS $52_5$ into the control of Mth BS 58 in the other cellular system, the received intensity of the pilot signal transmitted from Mth BS 58 increases. When the received intensity exceeds a predetermined level, then MS 61 transmits a pilot signal intensity report having the pilot number of Mth BS 58 which is included in the pilot signal to fifth BS $52_5$ in the home cellular system in step 102.

The pilot signal intensity report received by fifth BS $52_5$ is transferred to first MSC $50_1$ which has been called by MS 61 and manages communication path 101, via third BSC $51_3$ and second BSC $51_2$.

First BSC $51_1$ analyzes the received pilot signal intensity report as indicated by step 90 shown in FIG. 11. Specifically, as described above with reference to FIG. 11, first BSC $51_1$ checks the proximity cell information held thereby as shown in FIG. 10 in order to convert the pilot numbers indicated by the pilot signal intensity report into a cell ID. Since first BSC $51_1$ does not have fifth BSC $51_5$, first BSC $51_1$ refers to the registered inter-BSC hand-off control information as shown in FIG. 9 to look for a BSC which is the master station of the MS that is in communication modes including the soft hand-off mode in the communication path 101. In this case, since first BSC $51_1$ and third BSC $51_3$ communicates with MS 61 in the soft hand-off mode and in view of the received intensity of the radio wave and the hand-off information indicating that the soft hand-off destination is fifth BS $52_5$, third BSC $51_3$ which is the master station of fifth BS $52_5$ is selected. First BSC 511 transmits a pilot signal intensity report analysis request to selected third BSC $51_3$ in step 103.

Third BSC $51_3$ which has received the pilot signal intensity report analysis request converts the indicated pilot numbers into a corresponding cell ID based on the proximity cell information held thereby. Furthermore, third BSC $51_3$ recognizes whether the cell ID converted based on the proximity cell information belongs to the home cellular system or not based on the system identifier. The inter-system channel station data possessed by third BSC $51_3$ indicates that inter-system channel 60 is present between other system MSC 56 which is the master station of Mth BS 58, as shown in FIG. 8, and second MSC $50_2$ which is the master station of third BSC $51_3$. In step 104, inter-system channel presence/absence information which is "1" indicating the presence of inter-system channel 60 is transmitted as a pilot signal intensity report analysis result, together with the converted cell ID of Mth BS 58, to first BSC $51_1$ which has transmitted the pilot signal intensity report analysis request.

Having received the pilot signal intensity report analysis result from third BSC $51_3$, first BSC $51_1$ determines whether the received pilot signal intensity report includes only a cell ID of the home cellular system or not from the pilot signal intensity report analysis result, as indicated by step 91 in FIG. 11. Since the cell ID of Mth BS 58 in the other cellular system is contained, first BSC $51_1$ determines whether the received intensity of the pilot signal from Mth BS 58 is in excess of a predetermined level for inter-system hand-off or not, as indicated by step 92 in FIG. 11. If the received intensity of the pilot signal from Mth BS 58 is in excess of the predetermined level, then first BSC $51_1$ searches the inter-system channel station data shown in FIG. 6 which is possessed thereby, for the cell ID of Mth BS 58 in the other cellular system which is to serve as a hand-off destination, in step 105. As shown in FIG. 6, first MSC $50_1$ which is the master station of first BSC $51_1$ sees if it has an inter-system channel between itself and the other cellular system, and determines whether an inter-system hand-off control process is to be carried out or not in step 106. Since first MSC $50_1$ does not have an inter-system channel between itself and the other cellular system, first BSC $51_1$ performs an inter-MSC hand-off control process. As indicated by step 96 in FIG. 11, first BSC $51_1$ determines, as a hand-off destination, the MSC having an inter-system channel connected to an MSC which is the master station of a BS in the other cellular system converted based on the pilot signal intensity report analysis result and also having a cell in a best radio wave environment. In this embodiment, fifth BS $52_5$ under the control of second MSC $50_2$ is selected. Therefore, in order to carry out an inter-MSC hard hand-off control process, first BSC $51_1$ transmits an inter-MSC hard hand-off request for fifth BS $52_5$ to first MSC $50_1$ which is the master station thereof, in step 107.

First MSC $50_1$ which has received the inter-MSC hard hand-off request from first BSC $51_1$ performs an inter-MSC hard hand-off control process between itself and second MSC $50_2$ which is the master station of third BSC $51_3$ in step 108.

Specifically, first MSC $50_1$ transmits a hand-off request 109 via inter-MSC channel 54 to second MSC $50_2$. Second MSC $50_2$ transfers hand-off request 109 as hand-off request 110 to third BSC $51_3$ which is a hand-off destination. Third BSC $51_3$ sends a channel setting request 111 for setting another communication path different from communication path 101 to fifth BS $52_5$, and sends hand-off reply 112 to second MSC $50_2$. Second MSC $50_2$ sends hand-off reply 112 as hand-off reply 113 to first MSC $50_1$. Having received hand-off reply 113, first MSC $50_1$ transmits inter-switching-center hard hand-off reply 114 to first BSC $51_1$ which has transmitted the inter-switching-center hard hand-off request.

First BSC $51_1$ which has received inter-switching-center hard hand-off reply 114 from first MSC $50_1$ which is the master station thereof sends hand-off execution instruction 115 via the communication path 101 to MS 61.

MS 61 which has received hand-off execution instruction 115 makes a given hand-off execution preparatory action therein, and thereafter sends hand-off completion report 116 via communication path 101 to first BSC $51_1$.

First BSC $51_1$ which has received hand-off completion report 116 from MS 61 sends hand-off start report 117 to first MSC $50_1$.

Based on channel setting request 111 sent from third BSC $51_3$ to fifth BS $52_5$ and hand-off execution instruction 115 sent to MS 61, a new channel transfer process 118 is completed between MS 61 and third BSC $51_3$ via fifth BS $52_5$. Then, third BSC $51_3$ transmits a hand-off completion report 119 to second MSC $50_2$, which then sends hand-off completion report 119 as hand-off completion report 120 to first MSC $50_1$.

Having received hand-off completion report 120, first MSC $50_1$ transmits an old channel cancellation request 1221 via communication path 101 to first BSC $51_1$, second BSC $51_2$, third BSC $51_3$, and fifth BSC $51_5$, requesting the cancellation of communication path 101.

Thereafter, MS 61 communicates with a channel that is newly assigned between itself and fifth BS $52_5$, and there is established new communication path 122 via first MSC $50_1$, second MSC $50_2$, third BSC $51_3$, and fifth BS $52_5$.

In this manner, new communication path 122 is established after the inter-switching-center hard hand-off control process is completed. As MS 61 further moves in the direction indicated by the arrow 100, when the pilot signal sent from Mth BS 58 in the other cellular system and received by MS 61 exceeds a certain level, MS 61 transmits gain a pilot signal intensity report including the pilot numbers of Mth BS 58 to fifth BS $52_5$ in the home cellular system in step 130.

The pilot signal intensity report received by fifth BS $52_5$ is transferred to third BSC $51_3$ which manages communication path 122 connected to MS 61.

Third BSC $51_3$ analyzes the received pilot signal intensity report. Specifically, as described above with reference to FIG. 11, third BSC $51_3$ searches the proximity cell information held thereby as shown in FIG. 10 to convert the pilot numbers indicated by the pilot signal intensity report into a cell ID. Since third BSC $51_3$ has fifth BS $52_5$, third BSC $51_3$ extracts the pilot numbers from the pilot signal intensity report, and converts the pilot numbers into a corresponding cell ID. Third BSC $51_3$ then recognizes whether the cell ID converted from the pilot signal intensity report belongs to home cellular system or not based on the system identifier. The inter-system channel station data possessed by third BSC $51_3$ indicates that inter-system channel 60 is present between other system MSC 56 which is the master station of Mth BS 58, as shown in FIG. 8, and second MSC $50_2$ which is the master station of third BSC $51_3$. In step 131, third BSC $51_3$ extracts inter-system channel presence/absence information which is "1" indicating the presence of inter-system channel 60. In step 132, third BSC $51_3$ determines whether an inter-system hand-off control process is to be carried out or not based on the inter-system channel presence/absence information. In this embodiment, the extracted inter-system channel presence/absence information indicates that inter-system channel 60 is present between other system MSC 56 which is the master station of Mth BS 58 and second MSC $50_2$ which is the master station of third BSC $51_3$. Therefore, third BSC $51_3$ decides that an inter-system hand-off control process be carried out.

Then, third BSC $51_3$ transmits inter-system hand-off request 133 for hand-off to Mth BS 58 in the other cellular system to second MSC $50_2$ which is the master station of third BSC $51_3$. Having received inter-system hand-off request 133, second MSC $50_2$ performs an inter-system hand-off control process between itself and other system BSC 57 in the other cellular system in step 134.

Specifically, second MSC $50_2$ sends an inter-system hand-off request 135 via inter-system channel 60 to other system MSC 56 in the other cellular system. Having received inter-system hand-off request 135, other system MSC 56 makes a given inter-system hand-off control process preparatory action for other system BSC 57 and Mth BS 58 under its control, and thereafter sends inter-system hand-off reply 136 via inter-system channel 60 to second MSC $50_2$.

Second MSC $50_2$ sends inter-system hand-off reply 136 as other system hand-off reply 137 to third BSC $51_3$ which has transmitted inter-system hand-off request 133.

Third BSC $51_3$ sends hand-off execution instruction 134 to fifth BS $52_5$ under its control. Fifth BS $52_5$ sends hand-off execution instruction 134 to MS 61.

Having received hand-off execution instruction 134, MS 61 makes a given hand-off execution preparatory action therein, and thereafter sends hand-off completion report 139 via fifth BS $52_5$ to third BSC $51_3$.

Third BSC $51_3$ which has received hand-off completion report 139 from MS 61 sends hand-off start report 140 to second MSC $50_2$.

Second MSC $50_2$ transmits call disconnecting request 141 via communication path 122 connected as shown in FIG. 12 to third BSC $51_3$ and fifth BS $52_5$, and also transmits call disconnecting request 142 to first MSC $50_1$, disconnecting communication path 122. The hand-off control process for hand-off to Mth BS 58 in the other cellular system is now completed, after which MS 61 performs mobile communications in the other cellular system.

The mobile communication system according to the present embodiment, as described above, includes cellular systems each having MSCs which controls BSCs and BSs. At least one of the MSC in one cellular system (home cellular system) and an MSC in the other cellular system are interconnected by an inter-system channel. Each of the BSCs in the home cellular system has inter-system channel station data indicative of whether there is an inter-system channel connected between the MSC as the master station thereof and the MSC in the other cellular system. When a MS moving in the service area of the home cellular system enters the service area of the other cellular system and performs hand-off to the other cellular system, the BSC which is the master station of the MS checks the inter-system channel station data possessed thereby. If there is no inter-system channel connected between the MSC as the master station thereof and the MSC in the other cellular system, then an inter-MSC hard hand-off control process is carried out for hand-off to a BS under the control of an MSC which has an inter-system channel.

If there is an inter-system channel connected between the MSC as the master station thereof and the MSC in the other cellular system, then an inter-system hard hand-off control process is carried out for hand-off via the inter-system channel. Thus, in order to carry out an inter-system hard hand-off control process, it is only necessary to connect at least one of the MSC in the home cellular system and an MSC in the other cellular system with an inter-system channel. Inasmuch as it is not necessary to provide all adjacent MSCs in the different cellular systems with communication channels, the cost of facilities of the mobile communication system is greatly reduced. Particularly, a large-scale CDMA mobile communication system which has many MSCs allows the same frequency to be used in adjacent cells and hence allows an inter-system hand-off control process to be carried out using pilot signals of the same frequency between cells in different cellular systems. A reduction in the cost of facilities of such a large-scale CDMA mobile communication system is highly advantageous. The inter-system channel between the home and other cellular systems is connected only between MSCs adjacent to the service area of the other cellular system including an overlay. The cost of facilities of the inter-system channel required for the inter-system hand-off control process is thus minimized.

While the CDMA mobile communication system has been described in the above embodiment, the principles of the present invention are also applicable to other mobile communication systems such as TDMA and FDMA mobile communication systems which allow a hand-off control process.

In the above embodiment, a hand-off control process has been described as being performed between systems of different system providers. However, the principles of the present invention are also applicable to a hand-off control process between MSCs in one system. In such an application, the cost of facilities of inter-MSC channels can greatly be reduced.

While a preferred embodiment of the present invention has been described using specific terms, such description is for illustrative purposes only, and it is to be understood that changes and variations may be made without departing from the spirit or scope of the following claims.

What is claimed is:

1. A mobile communication system, comprising:

one or more base stations disposed in each of service areas for performing radio communication with a mobile station positioned in any of said service areas;

one or more base station controllers serving as a master station of said one or more base stations and having channel station data indicative of whether there is a channel between a mobile switching center as a master station thereof and another system mobile switching center in another system of different specifications, said one or more base station controllers having means for, when a mobile station enters the service area of the other system and then an inter-system hand-off control process is to be performed via said mobile switching center as the master station while communicating with said mobile station through said base station, determining whether or not, based on said channel station data, said mobile switching center as the master station has a channel connected to the other system mobile switching center, and, if said mobile switching center as the master station has a channel connected to the other system mobile switching center, requesting an inter-system hand-off control process as a process for switching communication channels between said mobile station and said other system mobile switching center to said mobile switching center as the master station, and, if said mobile switching center as the master station does not have a channel connected to the other system mobile switching center, requesting an intra-system hand-off control process between said mobile station and the mobile switching center in a home system; and one or more interconnected mobile switching centers serving as a master station of at least one of said one or more base station controllers, for performing said hand-off control process in a home system when the intra-system hand-off control process is requested, at least one of said one or more interconnected mobile switching centers having a communication channel connected to the other system mobile switching center, for performing a predetermined hand-off control process between itself and said other system mobile switching center when said inter-system hand-off control process is requested, wherein each said one or more mobile switching centers comprises means for, when said intra-system hand-off control process is requested, selecting a mobile switching center in the home system which has a communication channel connected to said other system mobile switching center, and performing a hand-off control process between itself and the selected mobile switching center.

2. A mobile communication system according to claim 1, further comprising a communication channel between only a mobile switching center adjacent to a service area of the other system including an overlay and said other system mobile switching center.

3. A mobile communication system according to claim 1, wherein said home system comprises a mobile communication system according to code division multiple access principles.

4. A mobile communication system according to claim 2, wherein said home system comprises a mobile communication system according to code division multiple access principles.

5. A base station controller in a mobile communication system, said base station controller comprising:

an interconnection to a first mobile switching center in a first mobile communication system;

a memory having stored therein a channel station data indicative of whether there is a channel between said first mobile switching center as a master station thereof and a second mobile switching center located in a second system said second system having a specification different from said first system; and a control module for, when a mobile station enters a service area of said second system and a hand-off control process is to be performed via said first mobile switching center as the master station while communication with said mobile station through a base station controlled by said base station controller, determining from said channel station data whether or not said first mobile switching center has a channel connected to said second mobile switching center wherein;

if said first mobile switching center is determined to have said connection to said second mobile switching center, said control module requests an inter-system hand-off and, if said first mobile switching center is determined not to have said connection to said second mobile switching center said control module requests an intra-system hand-off to another mobile switching center in said first system that does have said connection to said second mobile switching center.

6. The base station controller of claim 5, wherein said first system comprises a mobile communication system according to code division multiple access principles.

7. A method of communicating with a mobile station, said method comprising:

providing a base station controller in a first mobile communication system wherein a mobile station is located, said base station controller having an interconnection to a first mobile switching center in said first system, said base station controller having stored in a memory therein a channel station data indicative of whether there is a channel between said first mobile switching center serving as a master station thereof and a second mobile switching center in a second mobile communication system, said second mobile communication system having a specification different from a specification of said first system;

determining, based on said channel station data, when a mobile station enters a service area of said second system and then a hand-off control process is to be performed via said first mobile switching center as the master station while communication with said mobile station through a base station controlled by said base station controller to a base station in said second system, whether or not said first mobile switching center as the master station has a channel connected to said second mobile switching center;

if it is determined that no channel is connected, requesting an intra-system handoff to another mobile switching center in said first system that has such connection; and if it is determined that a channel is connected, requesting an inter-system handoff to said second mobile switching center in said second system.

8. The method of claim 7, wherein said first system comprises a mobile communication system according to code division multiple access principles.

9. The method of claim 7, wherein a communication channel between a mobile switching center in said first system and a mobile switching center in said second system occurs only between a mobile switching center in said first system that is adjacent to a service area of said second system and that includes an overlay.

* * * * *